US009303762B2

(12) United States Patent
Nishida

(10) Patent No.: US 9,303,762 B2
(45) Date of Patent: Apr. 5, 2016

(54) HYDRAULIC PRESSURE CONTROLLER FOR CONTINUOUSLY VARIABLE TRANSMISSION

(75) Inventor: Naofumi Nishida, Toyota (JP)

(73) Assignee: TOYOTA JIDOSHA KABUSHIKI KAISHA, Toyota-shi (JP)

(*) Notice: Subject to any disclaimer, the term of this patent is extended or adjusted under 35 U.S.C. 154(b) by 801 days.

(21) Appl. No.: 13/581,936

(22) PCT Filed: Apr. 26, 2010

(86) PCT No.: PCT/JP2010/057391
§ 371 (c)(1),
(2), (4) Date: Aug. 30, 2012

(87) PCT Pub. No.: WO2011/135659
PCT Pub. Date: Nov. 3, 2011

(65) Prior Publication Data
US 2012/0317969 A1    Dec. 20, 2012

(51) Int. Cl.
*F16H 61/662* (2006.01)
(52) U.S. Cl.
CPC ...... *F16H 61/66259* (2013.01); *F16H 61/6625* (2013.01); *F16H 61/66272* (2013.01); *F16H 2061/66286* (2013.01)
(58) Field of Classification Search
CPC .................. F16H 61/6625; F16H 2061/66286
See application file for complete search history.

(56) References Cited

U.S. PATENT DOCUMENTS

| 5,865,702 A | 2/1999 | Yokoyama et al. |
| 6,098,644 A | 8/2000 | Ichinose |
| 2007/0082769 A1 | 4/2007 | Nihei et al. |
| 2010/0255942 A1 | 10/2010 | Ogata et al. |

FOREIGN PATENT DOCUMENTS

| JP | 64 49752 | 2/1989 |
| JP | 9 280359 | 10/1997 |
| JP | 10 205642 | 8/1998 |
| JP | 11 210919 | 8/1999 |
| JP | 2000 120908 | 4/2000 |
| JP | 2007 100898 | 4/2007 |
| JP | 2009 156413 | 7/2009 |

OTHER PUBLICATIONS

International Search Report Issued Jul. 20, 2010 in PCT/JP10/57391 Filed Apr. 26, 2010.
International Preliminary Report on Patentability Issued Jan. 27, 2012 in PCT/JP10/057391 Filed Apr. 26, 2010.

*Primary Examiner* — F. Daniel Lopez
(74) *Attorney, Agent, or Firm* — Oblon, McClelland, Maier & Neustadt, L.L.P.

(57) ABSTRACT

Disclosed is a hydraulic control device for a continuously variable transmission which changes the transmission gear ratio by changing the hydraulic pressure supplied to hydraulic pressure chambers for pulleys in the continuously variable transmission via control valves is changed. In this hydraulic control device, line pressure regulation hydraulic pressure which corresponds to the magnitudes of the oil pressure supplied to the hydraulic pressure chambers is introduced into a regulator valve, and line pressure which is input into the control valves according to the magnitudes of the oil pressure is subjected to feedback regulation. In the hydraulic control device for the continuously variable transmission, after the valve element of the control valve is driven in the valve opening direction, a vibration restriction control operation which temporarily restricts the displacement of the valve element is executed.

7 Claims, 6 Drawing Sheets

HYDRAULIC PRESSURE CONTROLLER FOR CONTINUOUSLY VARIABLE TRANSMISSION

FIELD OF DISCLOSURE

The present invention relates to hydraulic pressure controllers for a continuously variable transmission that controls the hydraulic pressure supplied to each pulley of a belt type continuously variable transmission, and in particular, to a hydraulic pressure controller for a continuously variable transmission that feedback-adjusts a line pressure, which is an originating pressure of the hydraulic pressure supplied to each pulley, in accordance with the level of the hydraulic pressure supplied to each pulley.

BACKGROUND OF THE DISCLOSURE

A belt type continuously variable transmission is a known transmission mounted on a vehicle or the like. The belt type continuously variable transmission includes a first pulley that receives driving force from an internal combustion engine, a second pulley coupled to a vehicle wheel, and a belt running around the two pulleys. The continuously variable transmission changes the winding radius of the belt at each pulley to change the gear ratio in a continuous and stepless manner.

Such a belt type continuously variable transmission changes the hydraulic pressure of a hydraulic pressure chamber arranged in each pulley to change the balance of thrusts, which is the force that sandwiches the belt. This changes the winding ratio of the belt at each pulley and controls the gear ratio.

To this end, such a continuously variable transmission includes a hydraulic pressure controller that controls the hydraulic pressure supplied to each pulley. The hydraulic pressure controller includes a plurality of solenoid valves, which are driven based on an electrical drive command, and a plurality of control valves, which are driven by a driving hydraulic pressure output from the solenoid valves. The hydraulic pressure controller drives the control valves based on drive commands output from an electronic control unit to supply hydraulic oil to the hydraulic pressure chamber of each pulley or discharge hydraulic oil from the hydraulic pressure chamber of each pulley thereby controlling the hydraulic pressure of the hydraulic pressure chamber in each pulley.

In the hydraulic pressure controller for the continuously variable transmission, a regulator valve adjusts the hydraulic pressure of the hydraulic oil discharged from an oil pump and generates line pressure, which is the originating pressure of the hydraulic pressure to output from the control valves. The line pressure is input to the control valves, and the line pressure is adjusted by the control valves to generate the hydraulic pressure supplied to each pulley.

In the hydraulic pressure controller described above, a drive load of the oil pump becomes high when the line pressure becomes high. Thus, a hydraulic pressure controller for a continuously variable transmission that is described in patent document 1 feedback-adjusts the line pressure in accordance with the level of the hydraulic pressure supplied to each pulley.

Specifically, hydraulic pressure corresponding to the level of the hydraulic pressure supplied to each pulley is input to the regulator valve. The line pressure is increased when the hydraulic pressure supplied to each pulley is high, and the line pressure is decreased when the hydraulic pressure supplied to each pulley is low.

In this manner, by feedback adjusting the line pressure in accordance with the level of the hydraulic pressure supplied to each pulley, an excessive increase in the drive load of the oil pump when the line pressure increases more than necessary is suppressed.

PRIOR ART DOCUMENT

Patent Documents

Patent document 1: Japanese Laid-Open Patent Publication No. 2009-156413

DISCLOSURE OF THE INVENTION

Problems that are to be Solved by the Invention

When changing the hydraulic pressure supplied to each pulley, valve bodies of the control valves that control the hydraulic pressure supplied to the pulleys are driven, and a valve body of the regulator valve adjusts the line pressure. However, immediately after starting the driving of the valve bodies, inertia may excessively move the valve bodies and thereby oscillate the valve bodies.

If a valve body oscillates, the hydraulic pressure adjusted by the control valves and the regulator valve oscillates over a target hydraulic pressure. When the hydraulic pressure supplied to each pulley oscillates, the tension on the belt repetitively increases and decreases. This may result in slipping of the belt on each pulley or excessive load being applied to the belt and thereby lower the durability of the continuously variable transmission.

Further, once the hydraulic pressure supplied to each pulley starts to oscillate, the oscillating hydraulic pressure is fed back to the regulator valve and the line pressure is adjusted based on the fed back hydraulic pressure. As a result, the line pressure adjusted through the regulator valve is also oscillated. This may produce an adverse cycle in which the line pressure is feedback adjusted based on the oscillating hydraulic pressure, the oscillation is propagated to the line pressure, and the hydraulic pressure supplied to each pulley is adjusted based on the oscillating line pressure. As a result, a state in which the hydraulic pressure supply to each pulley oscillates may continue over a long period of time.

It is an object of the present invention to provide a hydraulic pressure controller for a continuously variable transmission capable of feedback adjusting the line pressure in accordance with the level of the hydraulic pressure supplied to each pulley and suppressing oscillation of the hydraulic pressure supplied to each pulley and the line pressure when changing the hydraulic pressure supplied to each pulley, while suppressing the drive load of the oil pump from becoming excessively large.

Means for Solving the Problems

To achieve the above object, after driving a valve body of the control valve in a valve opening direction, a hydraulic pressure controller according to the present invention executes oscillation suppression control that temporarily suppresses movement of the valve body.

Thus, oscillation of the valve body when the valve body is driven in the valve opening direction can be suppressed, and repetitive increase and decrease of the hydraulic pressure supplied to a pulley over a target hydraulic pressure is suppressed. Further, by suppressing such oscillation of the valve body and suppressing the oscillation of the hydraulic pressure supplied to the pulley, oscillation of the line pressure, which is feedback adjusted based on the hydraulic pressure supplied to the pulley, can be suppressed.

This can suppress the occurrence of an adverse cycle in which the line pressure is adjusted based on the oscillating hydraulic pressure and the hydraulic pressure supplied to each pulley is adjusted based on the oscillating line pressure.

In this manner, a hydraulic pressure controller for a continuously variable transmission according to the present invention feedback adjusts the line pressure in accordance with the level of the hydraulic pressure supplied to each pulley, suppresses excessive increases in the drive load applied to an oil pump, and suppresses oscillation of the hydraulic pressure, which is supplied to each pulley, and the line pressure when the hydraulic pressure supplied to each pulley is changed. This consequently suppresses repetitive increasing and decreasing of tension on a belt when the hydraulic pressure of the pulleys is changed and suppresses a decrease in the durability of the continuously variable transmission.

When the control valve uses a driving hydraulic pressure input to the control valve to drive the valve body in a valve opening direction, specifically, it is preferred that after starting to output the driving hydraulic pressure to the control valve to drive the valve body in the valve opening direction, oscillation suppression control is executed to further change the driving hydraulic pressure to suppress movement of the valve body in a valve closing direction when the valve body oscillates as the output of the driving hydraulic pressure starts.

More specifically, when the control valve moves the valve body in the valve opening direction as the driving hydraulic pressure increases, after starting the output of the driving hydraulic pressure to drive the valve body in the valve opening direction, the oscillation suppression control further increases the driving hydraulic pressure in accordance with a timing at which the valve body starts to move in the valve closing direction. The employment of such a configuration further increases the driving hydraulic pressure and offsets force that acts to move the valve body in the valve opening direction, suppresses movement of the valve body in the valve closing direction, and suppresses oscillation of the valve body.

After starting the output of the driving hydraulic pressure to the control valve to drive the valve body in the valve opening direction, the timing at which the valve body starts to move in the valve closing direction changes in accordance with the responsiveness or the like of the actual movement of the valve body relative to changes in the driving hydraulic pressure. When the temperature of the hydraulic oil is high, the viscosity of the hydraulic oil decreases. Thus, the responsiveness of the actual movement of the valve body relative to changes in the driving hydraulic pressure increases as the temperature of the hydraulic oil changes. That is, the valve body moves more readily when the driving hydraulic pressure is output as the temperature of the hydraulic oil increases. Further, after the driving hydraulic pressure is output, the timing at which the valve body starts to move in the valve closing direction is advanced as the temperature of the hydraulic oil increases.

Thus, after starting the output of the driving hydraulic pressure to the control valve to drive the valve body in the valve opening direction, it is preferred that a timing for further changing the driving hydraulic pressure be advanced as the temperature of the hydraulic oil increases. The employment of such a configuration allows for the timing for changing the hydraulic pressure to be set in accordance with changes in the responsiveness of the actual movement of the valve body relative to changes in the driving hydraulic pressure as the temperature of the hydraulic oil changes.

Further, as the hydraulic pressure output to the control valve to drive the valve body in the valve opening direction increases, the valve opening speed of the valve body when the driving hydraulic pressure is output increases. That is, as the hydraulic pressure output to drive the valve body in the valve opening direction increases, the valve body moves more readily when the valve body starts to move in the valve closing direction. Thus, as the hydraulic pressure output to the control valve to drive the valve body in the valve opening direction increases, after starting the output of the driving hydraulic pressure to the control valve to drive the valve body in the valve opening direction, the timing for further changing the driving hydraulic pressure may be advanced. When employing such a configuration, the timing for changing the driving hydraulic pressure may be set in accordance with changes in the valve opening speed of the valve body when the driving hydraulic pressure is output.

When the hydraulic pressure controller for a continuously variable transmission includes a control valve provided with a first pressure chamber and a second pressure chamber located on opposite sides of the valve body, and the control valve changes a level of the driving hydraulic pressure supplied to the first pressure chamber to drive the valve body, the movement of the valve body may be suppressed by prohibiting discharge of the hydraulic oil from the second pressure chamber and supply of the hydraulic oil to the second pressure chamber.

The oscillation of the valve body is apt to occur when the driving hydraulic oil acts on the valve body to drive the valve body in the valve opening direction.

Thus, when the hydraulic pressure controller for a continuously variable transmission feedback adjusts the line pressure in correspondence with a change in a larger one of a hydraulic pressure supplied to a first pulley, which is coupled to an internal combustion engine, and a hydraulic pressure supplied to a second pulley, which is coupled to a vehicle wheel, it is preferred that the execution conditions for executing oscillation suppression control be set so that when increasing the hydraulic pressure supplied to the first pulley, the oscillation suppression control is executed when the hydraulic pressure supplied to the first pulley becomes greater than the hydraulic pressure supplied to the second pulley.

The employment of such a configuration executes the oscillation suppression control under a situation that may result in an adverse cycle in which the hydraulic pressure supplied to each pulley oscillates continuously over a long period of time such as when the line pressure is feedback adjusted in correspondence with changes in the hydraulic pressure supplied to the first pulley when increasing the hydraulic pressure supplied to the first pulley.

Thus, a state in which the hydraulic pressure supplied to each pulley oscillates continuously over a long period of time is suppressed in a preferred manner.

DETAILED DESCRIPTION OF THE PREFERRED EMBODIMENTS

First Embodiment

Figure 1:
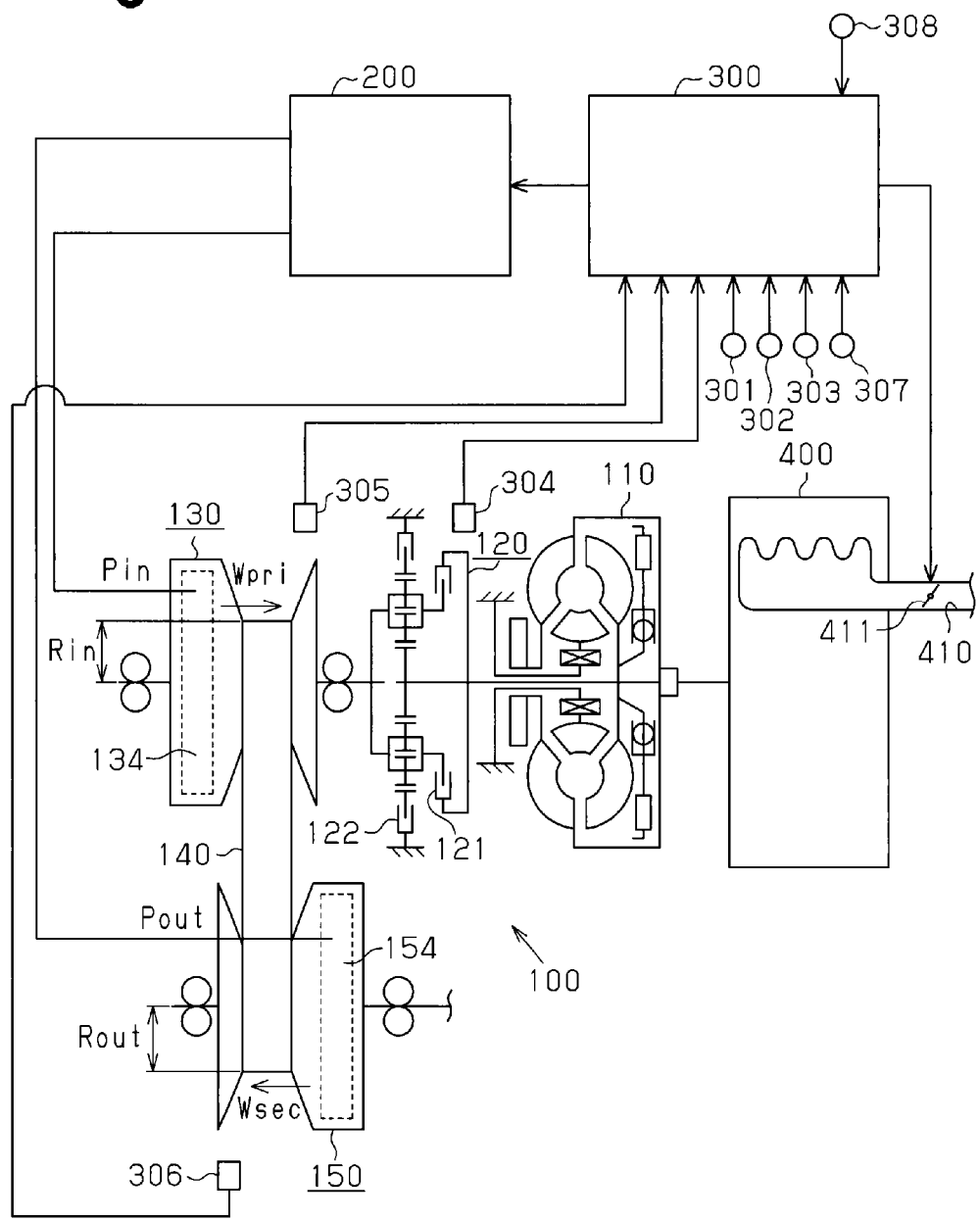
FIG. 1 is a schematic diagram showing a continuously variable transmission that is a control subject of a hydraulic pressure controller according to a first embodiment of the present invention.

One embodiment of a hydraulic pressure controller for a continuously variable transmission according to the present invention applied to an electronic control unit 300 that controls a continuously variable transmission 100, which is installed in a vehicle, and a hydraulic pressure control unit 200 will now be described with reference to FIGS. 1 to 6. FIG. 1 is a schematic diagram showing the structure of the continuously variable transmission 100, which is a control subject of the hydraulic pressure controller of the present invention.

As shown in FIG. 1, an input shaft of a torque converter 110 in the continuously variable transmission 100 is connected to an output shaft of an internal combustion engine 400. An output shaft of the torque converter 110 is connected to an input shaft of a switching mechanism 120.

The switching mechanism 120 is a double-pinion planet gear mechanism and includes a forward clutch 121 and a reverse brake 122. An output shaft of the switching mechanism 120 is connected to a first pulley 130.

When the forward clutch 121 is engaged and the reverse brake 122 is released, the driving force of the internal combustion engine 400, which is input through the torque converter 110, is directly transmitted to the first pulley 130. In contrast, when the forward clutch 121 is released and the reverse brake 122 is engaged, the driving force of the internal combustion engine 400, which is input through the torque converter 110, is reversed and transmitted to the first pulley 130 as a driving force of a reversed rotation.

In the switching mechanism 120, if the forward clutch 121 and the reverse brake 122 are both released, the transmission of the driving force between the internal combustion engine 400 and the first pulley 130 is cut off.

The first pulley 130, which is coupled to the internal combustion engine 400 by the torque converter 110 and the switching mechanism 120, is coupled to a second pulley 150, which is an output side pulley, by a belt 140. More specifically, a single belt 140 runs around the first pulley 130 and the second pulley 150 arranged in parallel as shown at the lower left side in FIG. 1. Driving force is transmitted between the first pulley 130 and the second pulley 150 by the belt 140.

The second pulley 150 is coupled to a differential through a reduction gear (not shown). Thus, the rotation of the second pulley 150 is transmitted to the differential via the reduction gear, and the rotation is transmitted to left and right drive wheels via the differential.

The first pulley 130 is formed by combining a fixed sheave and a movable sheave. A hydraulic pressure chamber 134 is defined and formed in the first pulley 130 as shown by broken lines in FIG. 1.

The second pulley 150 is also formed by combining a fixed sheave and a movable sheave. A hydraulic pressure chamber 154 is also defined and formed in the second pulley 150 as shown by broken lines in FIG. 1.

The belt 140 runs around the first pulley 130 and the second pulley 150, as described above. The belt 140 is sandwiched between the fixed sheave and the movable sheave of the first pulley 130 and sandwiched between the fixed sheave and the movable sheave of the second pulley 150.

Thus, when a hydraulic pressure Pin of the hydraulic pressure chamber 134 in the first pulley 130 is changed, the distance between the fixed sheave and the movable sheave of the first pulley 130 changes, and thrust Wpri acting on the belt 140 at the first pulley 130 changes. Further, when a hydraulic pressure Pout of the hydraulic pressure chamber 154 in the second pulley 150 changes, the distance between the fixed sheave and the movable sheave of the second pulley 150 changes, and thrust Wsec acting on the belt 140 at the second pulley 150 changes.

As shown in FIG. 1, each of the pulleys 130 and 150 includes a gradient at a portion that contacts the belt 140. Thus, when changing the thrust Wpri at the first pulley 130 and the thrust Wsec at the second pulley 150, winding radii Rin and Rout of the belt 140 at the pulleys 130 and 150 are changed.

More specifically, when increasing the hydraulic pressure Pin in the first pulley 130 to increase the thrust Wpri and decreasing the hydraulic pressure Pout in the second pulley 150 to decrease the thrust Wsec, the winding radius Rin of the belt 140 at the first pulley 130 is increased and the winding radius Rout of the belt 140 at the second pulley 150 is decreased. When decreasing the hydraulic pressure Pin in the first pulley 130 to decrease the thrust Wpri and increasing the hydraulic pressure Pout in the second pulley 150 to increase the thrust Wsec, the winding radius Rin of the belt 140 at the first pulley 130 is decreased and the winding radius Rout of the belt 140 at the second pulley 150 is increased.

In the continuously variable transmission 100, the hydraulic pressures Pin and Pout of the pulleys 130 and 150 are changed to change the thrusts Wpri and Wsec and change the winding radii Rin and Rout of the belt 140 at the pulleys 130 and 15. This controls a gear ratio γ.

More specifically, when performing upshifting and decreasing the gear ratio γ, the hydraulic pressure Pin of the hydraulic pressure chamber 134 in the first pulley 130 is increased to increase the thrust Wpri at the first pulley 130, and the hydraulic pressure Pout of the hydraulic pressure chamber 154 in the second pulley 150 is decreased to decrease the thrust Wsec at the second pulley 150. This increases the winding radius Rin of the belt 140 at the first pulley 130, decreases the winding radius Rout of the belt 140 at the second pulley 150, and decreases the gear ratio γ.

When performing downshifting and increasing the gear ratio γ, the hydraulic pressure Pin of the hydraulic pressure chamber 134 in the first pulley 130 is decreased to decrease the thrust Wpri at the first pulley 130, and the hydraulic pressure Pout of the hydraulic pressure chamber 154 in the second pulley 150 is increased to increase the thrust Wsec at the second pulley 150. This decreases the winding radius Rin of the belt 140 at the first pulley 130, increases the winding radius Rout of the belt 140 at the second pulley 150, and increases the gear ratio γ.

As shown in FIG. 1, the hydraulic pressure chambers 134 and 154 of the pulleys 130 and 150 are connected to the hydraulic pressure control unit 200. The hydraulic pressure control unit 200 is a hydraulic pressure circuit including a plurality of solenoid valves, which are driven based on a drive command output from the electronic control unit 300, and a control valve, which is driven by the drive hydraulic pressure output from the solenoid valves. The hydraulic pressure of the hydraulic oil is adjusted by operating the control valve to supply the hydraulic oil to the hydraulic pressure chambers 134 and 154 or discharge the hydraulic oil from the hydraulic pressure chambers 134 and 154 thereby adjusting the hydraulic pressures Pin and Pout of the hydraulic pressure chambers 134 and 154.

The electronic control unit 300 includes a central processing unit (CPU) that executes calculations related to the control of the internal combustion engine 400, calculations related to the control of the continuously variable transmission 100 through the hydraulic pressure control unit 200, and the like. Further, the electronic control unit 300 includes a read-out only memory (ROM), which stores calculation programs and calculation maps for the calculations in addition to various types of data, a random access memory (RAM) that temporarily stores calculation results, and the like.

As shown in FIG. 1, the electronic control unit 300 is connected to the sensors described below.

An accelerator position sensor 301 detects the amount of an accelerator pedal depressed by a driver. An air flow meter 302 detects the amount and temperature of the air drawn into the internal combustion engine 400. A crank angle sensor 303 detects the engine speed NE based on a rotation angle of a crankshaft, which is an output shaft of the internal combustion engine 400. A turbine rotation number sensor 304 is arranged in the vicinity of the switching mechanism 120 and detects the rotation speed of a turbine of the torque converter 110. A first pulley rotation speed sensor 305 is arranged in the vicinity of the first pulley 130 and detects the rotation speed Nin of the first pulley 130. A second pulley rotation speed sensor 306 is arranged in the vicinity of the second pulley 150 and detects the rotation speed Nout of the second pulley 150. Wheel speed sensors 307 are respectively arranged in the vicinity of the vehicle wheels and detect the rotation speed of the corresponding vehicle wheels. A temperature sensor 308 detects the temperature of the hydraulic oil supplied to the hydraulic pressure chambers 134 and 154 by the hydraulic pressure control unit 200.

Based on output signals from the various sensors 301 to 308, the electronic control unit 300 entirely controls the internal combustion engine 400 and the continuously variable transmission 100. For example, a vehicle speed SPD is calculated based on the rotation speed Nout of the second pulley 150, which is detected by the second pulley rotation speed sensor 306. A required torque is calculated based on the current vehicle speed SPD and the depression amount of the accelerator pedal detected by the accelerator position sensor 301. An opening degree Th of a throttle valve 411, which is arranged in an intake passage 410 of the internal combustion engine 400, is adjusted to adjust intake air amount GA and realize the required torque.

Further, when adjusting the intake air amount GA, the electronic control unit 300 calculates a target gear ratio γtrg as the gear ratio γ that most efficiently generates the request torque. The electronic control unit 300 also executes gear shift control that controls the hydraulic pressure control unit 200 so that the actual gear ratio γ conforms to the calculated target gear ratio γtrg. In other words, in the present embodiment, the electronic control unit 300 and the hydraulic pressure control unit 200 form the hydraulic pressure controller for the continuously variable transmission 100.

In the gear shift control, the current gear ratio γ is calculated based on the rotation speed Nin of the first pulley 130 and the rotation speed Nout of the second pulley 150. Further, to bring the gear ratio γ closer to the target gear ratio γtrg, the hydraulic pressure Pin in the first pulley 130 is changed to change the thrust Wpri. The thrust Wpri at the first pulley 130 is changed, and the hydraulic pressure Pout in the second pulley 150 is changed to change the thrust Wsec so that the belt 140 does not slip on the pulleys 130 and 150.

Figure 2:
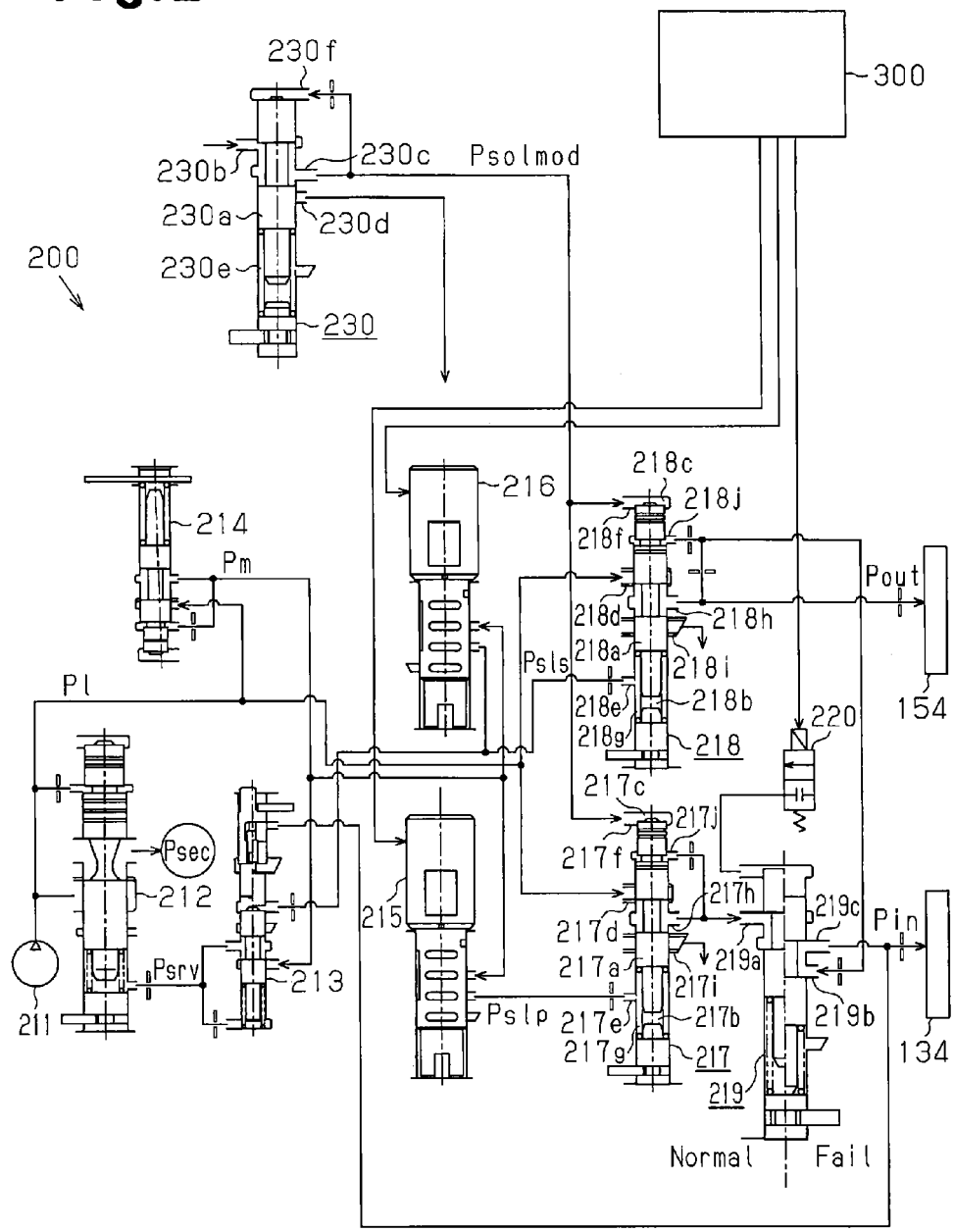
FIG. 2 is a schematic diagram showing the structure of a hydraulic pressure control unit in the hydraulic pressure controller of the first embodiment.

A structure of the hydraulic pressure control unit 200 will now be described in detail with reference to FIG. 2. FIG. 2 is a schematic diagram showing the structure of the hydraulic pressure control unit 200 in the hydraulic pressure controller according to the present embodiment.

As shown at the left side in FIG. 2, the hydraulic pressure control unit 200 includes a regulator valve 212 that adjusts the pressure of the hydraulic oil discharged from the oil pump 211 to generate line pressure Pl, which becomes the originating pressure of the hydraulic pressures Pin and Pout. The regulator valve 212 sends some of the hydraulic oil discharged from the oil pump 211 to another regulator valve (not shown) based on the level of the line pressure Pl. The hydraulic oil send from the regulator valve 212 to another regulator valve is supplied to the torque converter 110 and the switching mechanism 120 as a hydraulic pressure Psec. The regulator valve 212 adjusts the line pressure Pl by discharging some of the hydraulic oil discharged from the oil pump 211 based on the level of the line pressure Pl.

The hydraulic pressure control unit 200 includes a modulator valve 214 that further depressurizes the line pressure Pl and generates a fixed modulator pressure Pm. The modulator pressure Pm output from the modulator valve 214 is supplied to a first solenoid valve 215 and a second solenoid valve 216.

The first solenoid valve 215, which is electrically driven by a drive command output from the electronic control unit 300, adjusts the modulator pressure Pm to generate a first solenoid pressure Pslp, which is the driving hydraulic pressure of a first control valve 217. More specifically, the first solenoid valve 215, which is a normally open type solenoid valve that closes when supplied with power, outputs a larger first solenoid pressure Pslp as the drive duty decreases in accordance with the level of the drive duty output as the drive command from the electronic control unit 300.

The second solenoid valve 216, which is electrically driven by a drive command output from the electronic control unit 300, adjusts the modulator pressure Pm to generate a second solenoid pressure Psls, which is the driving hydraulic pressure of a second control valve 218. The second solenoid valve 216, which is also a normally open type solenoid valve like the first solenoid valve 215, outputs a larger second solenoid pressure Psls as the drive duty decreases in accordance with the level of the drive duty output as the drive command from the electronic control unit 300.

The first solenoid pressure Pslp, which is output from the first solenoid valve 215, is input to the first control valve 217. The first control valve 217 adjusts the line pressure Pl in accordance with the first solenoid pressure Pslp. This adjusts the level of the hydraulic pressure supplied to the hydraulic pressure chamber 134 in the first pulley 130 and controls the hydraulic pressure Pin of the hydraulic pressure chamber 134.

The first control valve 217 includes three input ports 217d, 217e, and 217f. The first solenoid pressure Pslp is input to the second input port 217e. The line pressure Pl is input to the first input port 217d, and the solenoid modulator pressure Psolmod is input to the third input port 217f.

The first control valve 217 accommodates a valve body 217a that is movable in the axial direction. A first pressure chamber 217b and a second pressure chamber 217c are defined and formed in the first control valve 217 so as to sandwich the valve body 217a. The second input port 217e is connected to the first pressure chamber 217b, and the third input port 217f is connected to the second pressure chamber 217c.

As a result, the first solenoid pressure Pslp supplied to the first pressure chamber 217b through the second input port 217e and the solenoid modulator pressure Psolmod supplied to the second pressure chamber 217c through the third input port 217f act from opposite directions on the valve body 217a of the first control valve 217. A spring 217g is accommodated in the first pressure chamber 217b in a compressed state as a biasing member for biasing the valve body 217a toward the second pressure chamber 217c.

The solenoid modulator pressure Psolmod supplied to the second pressure chamber 217c through the third input port 217f is adjusted to a certain level by a pressure adjustment valve 230, as will be described later. Thus, the balance of the forces acting on the valve body 217a of the first control valve 217 changes in accordance with the level of the first solenoid pressure Pslp supplied to the first pressure chamber 217b through the second input port 217e. The valve body 217a is moved in the axial direction in accordance with changes in the balance of the forces.

The first control valve 217 further includes an output port 217h connected to the hydraulic pressure chamber 134 in the first pulley 130 through a failsafe valve 219, which will be described later, a discharge port 217i connected to a discharge passage, and a feedback port 217j.

The first control valve 217 moves the valve body 217a in accordance with the balance of the forces acting on the valve body 217a. Further, the first control valve 217 moves the valve body 217a toward the second pressure chamber 217c when the first solenoid pressure Pslp become high and the pressure in the first pressure chamber 217b becomes high. Thus, in the first control valve 217, when the first solenoid pressure Pslp becomes high, the first input port 217d opens and communicates the first input port 217d and the output port 217h.

As a result, when the first solenoid pressure Pslp becomes high, some of the hydraulic oil input through the first input port 217d is supplied to the hydraulic pressure chamber 134 in the first pulley 130 through the output port 217h.

The first control valve 217 is formed so that the driving force toward the second pressure chamber 217c, that is, the driving force in the valve opening direction, increases as the input first solenoid pressure Pslp increases. Thus, as the first solenoid pressure Pslp increases, the hydraulic pressure output from the first control valve 217 increases and the hydraulic pressure Pin of the hydraulic pressure chamber 134 increases.

Further, as shown in FIG. 2, some of the hydraulic pressure supplied to the hydraulic pressure chamber 134 is fed back to act on the valve body 217a through the feedback port 217j. Thus, when the hydraulic pressure Pin increases and approaches the hydraulic pressure corresponding to the level of the first solenoid pressure Pslp, the valve body 217a moves toward the first pressure chamber 217b. When the hydraulic pressure Pin becomes equal to the hydraulic pressure corresponding to the level of the first solenoid pressure Pslp, the valve body 217a closes the first input port 217d.

When the hydraulic pressure Pin becomes higher than the hydraulic pressure corresponding to the level of the first solenoid pressure Pslp, the valve body 217a further moves toward the first pressure chamber 217b, and the discharge port 217i opens and communicates the output port 217h and the discharge port 217i. This discharges the hydraulic oil from the hydraulic pressure chamber 134 to the discharge passage through the output port 217h and the discharge port 217i, and the hydraulic pressure Pin of the hydraulic pressure chamber 134 is adjusted to the hydraulic pressure corresponding to the level of the first solenoid pressure Pslp.

The hydraulic oil discharged through the discharge passage is collected in an oil pan (not shown) and supplied again to each part by the oil pump 211.

The second solenoid pressure Psls output from the second solenoid valve 216 is input to the second control valve 218. The second control valve 218 adjusts the line pressure Pl in accordance with the second solenoid pressure Psls to adjust the level of the hydraulic pressure supplied to the hydraulic pressure chamber 154 in the second pulley 150 and control the hydraulic pressure Pout of the hydraulic pressure chamber 154.

The second control valve 218 includes three input ports 218d, 218e, and 218f like the first control valve 217. The second solenoid pressure Psls is input to the second input port 218e. The line pressure Pl is input to the first input port 218d, and the solenoid modulator pressure Psolmod is input to the third input port 218f.

The second control valve 218 accommodates a valve body 218a, which is movable in the axial direction. A first pressure chamber 218b and a second pressure chamber 218c are defined and formed in the second control valve 218 so as to sandwich the valve body 218a. The second input port 218e is connected to the first pressure chamber 218b, and the third input port 218f is connected to the second pressure chamber 218c.

As a result, the second solenoid pressure Psls supplied to the first pressure chamber 218b through the second input port 218e and the solenoid modulator pressure Psolmod supplied to the second pressure chamber 218c through the third input port 218f act from opposite directions on the valve body 218a of the second control valve 218. A spring 218g is accommodated in the first pressure chamber 218b in a compressed state as a biasing member for biasing the valve body 218a toward the second pressure chamber 218c.

The solenoid modulator pressure Psolmod supplied to the second pressure chamber 218c through the third input port 218f is adjusted to a certain level by the pressure adjustment valve 230, as will be described later. Thus, the balance of the forces acting on the valve body 218a of the second control valve 218 changes in accordance with the level of the second solenoid pressure Psls supplied to the first pressure chamber 218b through the second input port 218e. The valve body 218a is moved in the axial direction in accordance with such change in balance of the forces.

The second control valve 218 further includes an output port 218h connected to the hydraulic pressure chamber 154 in the second pulley 150, a discharge port 218i connected to the discharge passage, and a feedback port 218j.

The second control valve 218 moves the valve body 217a in accordance with the balance of forces acting on the valve body 218a. When the second solenoid pressure Psls increases and the pressure in the first pressure chamber 218b increases, the valve body 218a is moved toward the second pressure chamber 218c. Thus, in the second control valve 218, when the second solenoid pressure Psls becomes high, the first input port 218*d* opens and communicates the first input port 218*d* and the output port 218*h*.

Thus, when the second solenoid pressure Psls becomes high, some of the hydraulic oil input through the first input port 218*d* is supplied to the hydraulic pressure chamber 154 in the second pulley 150 through the output port 218*h*.

The second control valve 218 is formed so that the driving force toward the second pressure chamber 218*c*, that is, the driving force in the valve opening direction increases as the input second solenoid pressure Psls increases. Thus, as the second solenoid pressure Psls increases, the hydraulic pressure output from the second control valve 218 increases and the hydraulic pressure Pout of the hydraulic pressure chamber 154 increases.

Further, as shown in FIG. 2, some of the hydraulic pressure supplied to the hydraulic pressure chamber 154 is fed back to act on the valve body 218*a* through the feedback port 218*j*. Thus, when the hydraulic pressure Pout increases and approaches the hydraulic pressure corresponding to the level of the second solenoid pressure Psls, the valve body 218*a* moves toward the first pressure chamber 218*b*. When the hydraulic pressure Pout becomes equal to the hydraulic pressure corresponding to the level of the second solenoid pressure Psls, the valve body 218*a* closes the first input port 218*d*.

When the hydraulic pressure Pout becomes higher than the hydraulic pressure corresponding to the level of the second solenoid pressure Psls, the valve body 218*a* is further moved toward the first pressure chamber 218*b*, and the discharge port 218*i* opens thereby communicating the output port 218*h* and the discharge port 218*i*. This discharges the hydraulic oil in the hydraulic pressure chamber 154 to the discharge passage through the output port 218*h* and the discharge port 218*i*, and the hydraulic pressure Pout of the hydraulic pressure chamber 154 is adjusted to the hydraulic pressure corresponding to the level of the second solenoid pressure Psls.

The solenoid modulator pressure Psolmod is adjusted to a certain level through the pressure adjustment valve 230 shown at the upper part of FIG. 2.

The pressure adjustment valve 230 includes an input port 230*b*, an output port 230*c*, and a discharge port 230*d*. The pressure adjustment valve 230 accommodates a valve body 230*a*, which is movable in an axial direction.

A spring 230*e* is accommodated in the pressure adjustment valve 230 in a compressed state as a biasing member for biasing the valve body 230*a* in one direction. Thus, the valve body 230*a* is always biased in the same direction by the spring 230*e* so as to communicate the input port 230*b* and the output port 230*c* as shown in FIG. 2.

Hydraulic pressure further depressurized from the line pressure Pl is input to the input port 230*b* of the pressure adjustment valve 230. The output port 230*c* of the pressure adjustment valve 230 is connected to the third input port 217*f* of the first control valve 217 and the third input port 218*f* of the second control valve 218 as shown in FIG. 2.

Some of the hydraulic oil output from the output port 230*c* is fed back to the valve body 230*a* through a feedback port 230*f*.

Thus, when the solenoid modulator pressure Psolmod, which is the hydraulic pressure of the hydraulic oil output from the output port 230*c*, becomes excessively high, the valve body 230*a* is moved against the biasing force of the spring 230*e* by the hydraulic pressure fed back through the feedback port 230*f*.

In this manner, when the valve body 230*a* is moved in the valve opening direction against the biasing force of the spring 230*e*, the valve body 230*a* closes the input port 230*b* and opens the discharge port 230*d* thereby communicating the output port 230*c* and the discharge port 230*d*. As a result, some of the hydraulic oil supplied to the second pressure chamber 217*c* of the first control valve 217 and the second pressure chamber 218*c* of the second control valve 218 is discharged through the output port 230*c* and the discharge port 230*d*.

When some of the hydraulic oil supplied to the second pressure chambers 217*c* and 218*c* through the discharge port 230*d* of the pressure adjustment valve 230 is discharged in such a manner, the solenoid module pressure Psolmod decreases and adjusts the solenoid modulator pressure Psolmod to a certain level.

The hydraulic oil discharged from the discharge port 230*d* is collected in the oil pan (not illustrated) through the discharge passage and supplied to each part again by the oil pump 211.

The electronic control unit 300 executes gear shift control to change the drive duty output to the first solenoid valve 215 and the second solenoid valve 216 and control the first solenoid pressure Pslp and the second solenoid pressure Psls.

The electronic control unit 300 controls the hydraulic pressure control unit 200 to adjust the hydraulic pressures Pin and Pout of the hydraulic pressure chambers 134 and 154 in the pulleys 130 and 150 so that the gear ratio $\gamma$ conforms to the target gear ratio $\gamma$trg.

When an abnormality occurs in the first control valve 217 or the first solenoid valve 215, the hydraulic pressure Pin cannot be properly controlled and the hydraulic pressure Pin may increase one-sidedly or decrease one-sidedly.

For instance, when a foreign matter or the like is caught in the first control valve 217 and the necessary amount of hydraulic oil cannot be supplied to the hydraulic pressure chamber 134, the hydraulic pressure Pin becomes insufficient and imbalances the thrusts Wpri and Wsec in the pulleys 130 and 150, and the tension of the belt 140 pushes and opens the first pulley 130. As a result, the gear ratio $\gamma$ becomes high in a one-sided manner and the engine speed NE increases.

In this regard, the hydraulic pressure control unit 200 includes the failsafe valve 219, which switches the supply path of the hydraulic oil supplied to the first pulley 130.

The hydraulic oil output from the output port 217*h* of the first control valve 217 is supplied to the hydraulic pressure chamber 134 in the first pulley 130 through the failsafe valve 219 as shown at the lower right side of FIG. 2. In the first pulley 130, the movable sheave moves in accordance with the hydraulic pressure Pin in the hydraulic pressure chamber 134 as described above. This changes the distance between the fixed sheave and the movable sheave.

The hydraulic oil output from the output port 218*h* of the second control valve 218 and supplied to the hydraulic pressure chamber 154 in the second pulley 150 is directly supplied to the hydraulic pressure chamber 154 in the second pulley 150 without passing the failsafe valve 219. In the second pulley 150, the movable sheave is moved in accordance with the hydraulic pressure Pout in the hydraulic pressure chamber 154 as described above. This changes the distance between the fixed sheave and the movable sheave.

The failsafe valve 219 arranged between the first control valve 217 and the first pulley 130 includes a first input port 219*a* to which the hydraulic oil output from the output port 217*h* of the first control valve 217 is introduced and a second input port 219*b* into which the hydraulic oil output from the output port 218*h* of the second control valve 218 is drawn as shown in FIG. 2. The failsafe valve 219 is formed to selectively communicate one of the first input port 219*a* and the second input port 219*b* to the output port 219*c* in accordance with the position of the valve body driven by the driving hydraulic pressure output from a switching solenoid valve 220.

More specifically, in a normal state in which the switching solenoid valve 220 is in the "OFF" state and the driving hydraulic pressure is not output from the switching solenoid valve 220, the first input port 219a is in communication with the output port 219c. In a fail state in which the switching solenoid valve 220 is in the "ON" state and the driving hydraulic pressure is output from the switching solenoid valve 220, the second input port 219b is in communication with the output port 219c. In other words, the failsafe valve 219 is formed to select one of the hydraulic oil adjusted through the first control valve 217 and the hydraulic oil adjusted through the second control valve 218 and output the selected one to the first pulley 130.

The electronic control unit 300 switches the switching solenoid valve 220 to the "ON" state when the hydraulic pressure Pin in the first pulley 130 cannot be properly controlled by the first control valve 217. This switches the supply path of the hydraulic oil so that the hydraulic oil adjusted by the second control valve 218 is also supplied to the first pulley 130. The hydraulic pressures Pin and Pout of the pulleys 130 and 150 thus become equal, and the gear ratio γ can be suppressed from increasing in a one-sided manner.

As shown in the right side of FIG. 2, the oil path for drawing hydraulic oil into the hydraulic pressure chamber 134 of the first pulley 130 and the oil path for drawing the hydraulic oil into the hydraulic pressure chamber 154 of the second pulley 150 each include an orifice. These orifices are used so that the hydraulic oil in the hydraulic pressure chambers 134 and 154 is not rapidly discharged and the hydraulic pressures Pin and Pout are not rapidly decreased to prevent slipping of the belt 140 on the pulleys 130 and 150.

In the hydraulic pressure controller of the present embodiment, the line pressure Pl is maintained at the minimum required level, and the feedback adjustment of the line pressure Pl is performed to minimize the drive load on the oil pump 211.

More specifically, the hydraulic pressure Pin of the hydraulic pressure chamber 134 in the first pulley 130 and the second solenoid pressure Psls output by the second solenoid valve 216 are each conveyed to a reduction valve 213 to feedback adjust the line pressure Pl. The reduction valve 213 adjusts the modulator pressure Pm in accordance with the conveyed hydraulic pressure Pin and the second solenoid pressure Psls to generate a line pressure adjustment hydraulic pressure Psrv. The line pressure adjustment hydraulic pressure Psrv is conveyed to the regulator valve 212 and used to adjust the line pressure Pl in the regulator valve 212.

In other words, in the hydraulic pressure control unit 200 of the present embodiment, the line pressure Pl is feedback adjusted in accordance with the line pressure adjustment hydraulic pressure Psrv that changes in accordance with the levels of the hydraulic pressures Pin and Pout in the pulleys 130 and 150.

Through such feedback adjustment with the reduction valve 213, the line pressure Pl is adjusted to be slightly higher than the higher one of the hydraulic pressure Pin and the hydraulic pressure Pout.

The feedback adjustment of the line pressure Pl in accordance with the levels of the hydraulic pressures Pin and Pout supplied to the pulleys 130 and 150 prevents the line pressure Pl from increasing more than necessary and prevents the drive load of the oil pump 211 from becoming excessively high.

When changing the hydraulic pressures Pin and Pout, the valve bodies 217a and 218a of the control valves 217 and 218 are driven and the valve body of the regulator valve 212 is driven. However, inertia may excessively move the valve body immediately after starting to drive the valve body. This may oscillate the valve body.

Figure 3:
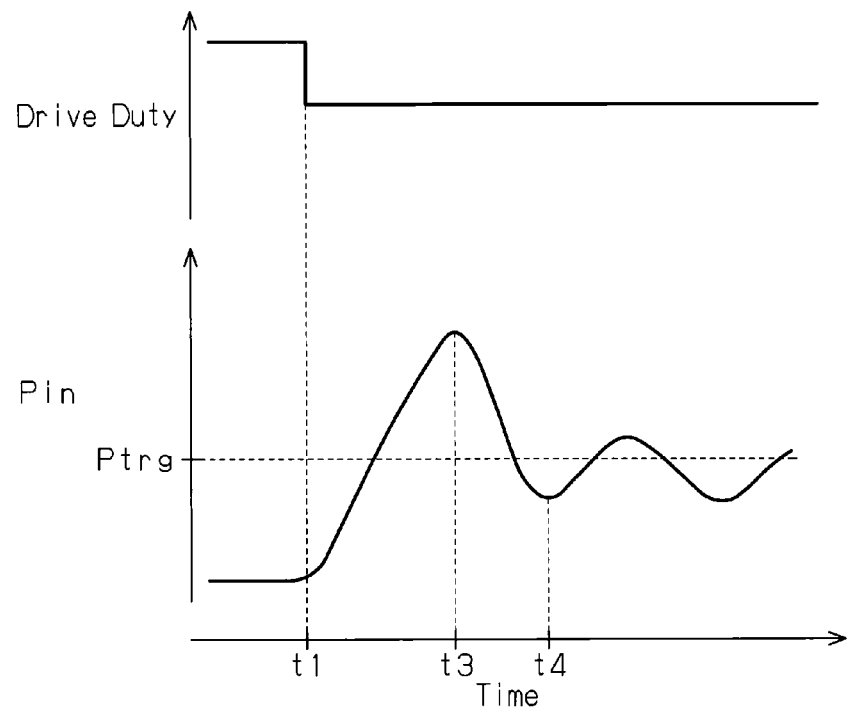
FIG. 3 is a time chart showing the relationship of a change in the drive duty of a first solenoid valve and a change in the hydraulic pressure supplied to a first pulley in a gear shift control of the prior art.

For instance, immediately after decreasing the drive duty of the first solenoid valve 215 and increasing the first solenoid pressure Pslp, which is the driving hydraulic pressure, to increase the hydraulic pressure Pin as shown in FIG. 3, inertia excessively moves the valve body 217a in the valve opening direction and oscillates the valve body 217a. When the valve body 217a is oscillated, the oscillation of the valve body 217a may also oscillate the hydraulic pressure Pin adjusted through the control valve 217 over the target hydraulic pressure Ptrg as shown in FIG. 3.

When the hydraulic pressure Pin is oscillated in such a manner, the tension on the belt 140 repetitively increases and decreases therewith. This may result in the belt 140 slipping on the pulleys 130 and 150 or excessive load being applied to the belt 140 thereby lowering the durability of the continuously variable transmission 100.

Once the hydraulic pressure Pin is oscillated as shown in FIG. 3 when the hydraulic pressure Pin is greater than the hydraulic pressure Pout, the line pressure adjustment hydraulic pressure Psrv that changes in accordance with the oscillating hydraulic pressure Pin is input to the regulator valve 212. Thus, the line pressure Pl is feedback adjusted in accordance with changes in the oscillating hydraulic pressure Pin, and the line pressure Pl adjusted by the regulator valve 212 is oscillated. In other words, an adverse cycle in which the oscillation is propagated to the line pressure Pl, and the hydraulic pressures Pin and Pout supplied to the pulleys 130 and 150 are adjusted in accordance with the oscillating line pressure Pl occurs.

As a result, the oscillation of the hydraulic pressure Pin resists attenuation, and a state in which the hydraulic pressures Pin and Pout supplied to the pulleys 130 and 150 oscillate is continued for a long period of time.

Figure 4:
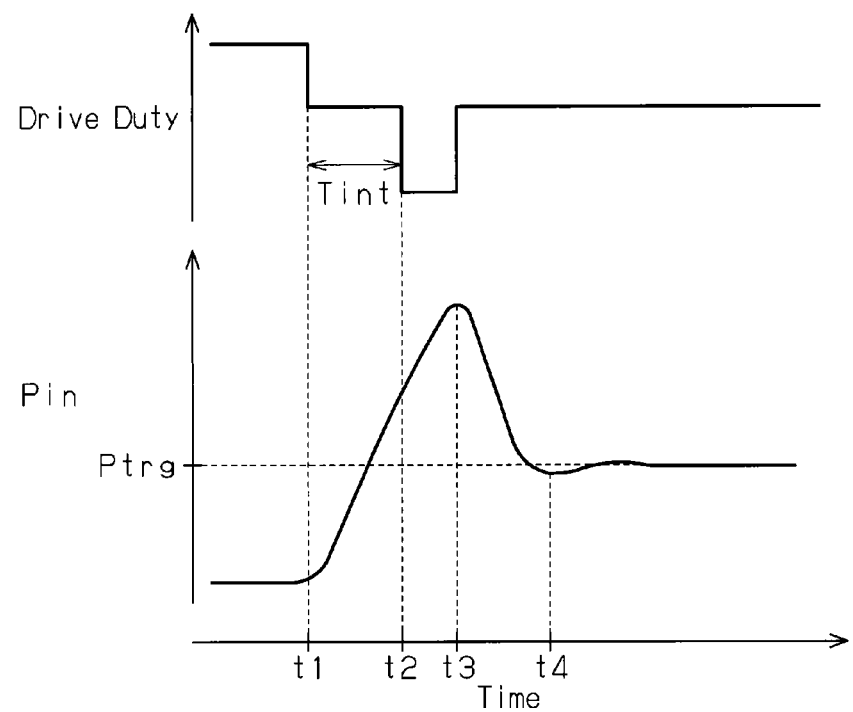
FIG. 4 is a time chart showing the relationship of a change in the drive duty of a first solenoid valve and a change in the hydraulic pressure supplied to the first pulley when a oscillation suppression control of the first embodiment is executed.

In the electronic control unit 300 of the present embodiment, oscillation suppression control is executed to suppressing the oscillation of the hydraulic pressure Pin by decreasing the drive duty and increasing the first solenoid pressure Pslp and then further decreasing the drive duty and increasing the first solenoid pressure Pslp as shown in FIG. 4.

When the drive duty is decreased at time t1 as shown in FIG. 3 to increase the hydraulic pressure Pin, the hydraulic pressure Pin exceeds and overshoots the target hydraulic pressure Ptrg. As shown in FIG. 3, the hydraulic pressure Pin starts to decrease from time t3 and starts to increase again at time t4. In the oscillation suppression control, as shown in FIG. 4, the drive duty is decreased at time t1. Then, at time t2, the drive duty is further decreased and the first solenoid pressure Pslp is further increased so that the valve body 217a can be biased in the valve opening direction from time t3 to time t4.

In this manner, by further increasing the first solenoid pressure Pslp at time t2, the valve body 217a excessively moved in the valve opening direction as the first solenoid pressure Pslp increases at time t1 offsets the portion of the force acting to move the valve body 217a in the valve closing direction and suppresses oscillation of the valve body 217a.

This suppresses undershooting of the hydraulic pressure Pin at time t4 and suppresses oscillation of the hydraulic pressure Pin as show in FIG. 4.

Figure 5:
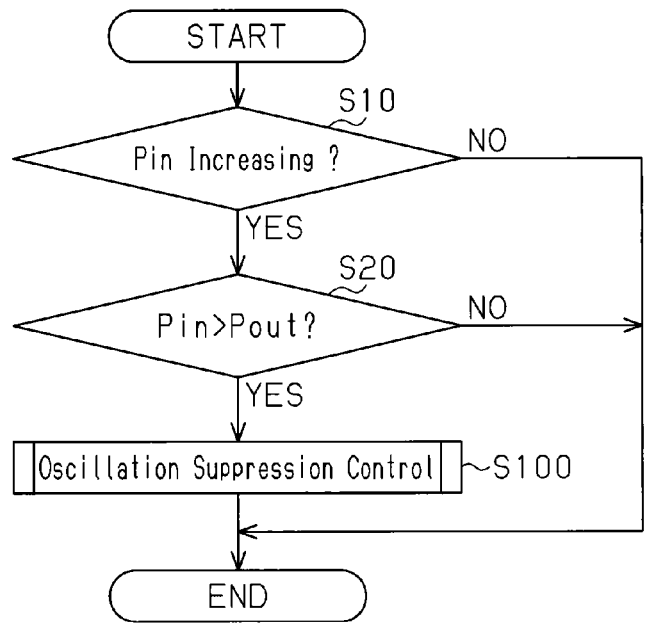
FIG. 5 is a flowchart showing a flow of a series of processes related to the execution of the oscillation suppression control of the first embodiment.
Figure 6:
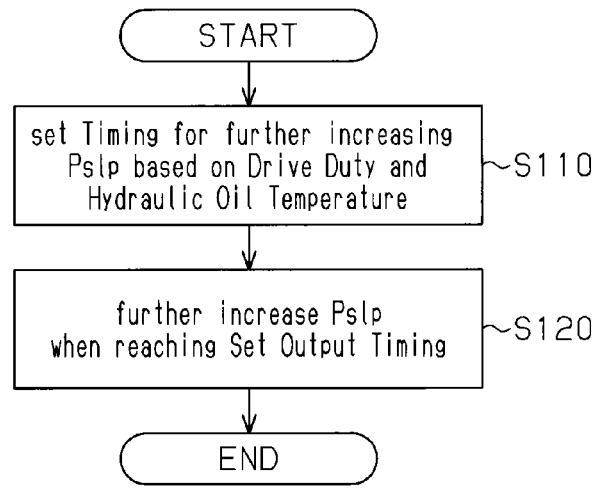
FIG. 6 is a flowchart showing a flow of processes in the oscillation suppression control of the first embodiment.

The flow of processes related to the oscillation suppression control will now be specifically described with reference to FIGS. 5 and 6. FIG. 5 is a flowchart showing the flow of a series of processes related to the oscillation suppression control, and FIG. 6 is a flowchart showing the flow of a process of the oscillation suppression control. The series of processes shown in FIG. 5 are repeatedly executed in predetermined control cycles in the electronic control unit 300 when the engine is running.

When the series of processes shown in FIG. 5 is started, the electronic control unit 300 first determines in step S10 whether or not to increase the hydraulic pressure Pin. For instance, if the target gear ratio γtrg is less than the current gear ratio γ and the hydraulic pressure Pin needs to be increased for upshifting, it is determined that the hydraulic pressure Pin should be increased. If the target gear ratio γtrg and the current gear ratio γ are in conformance or if the target gear ratio γtrg is greater than the current gear ratio γ, it is determined that the hydraulic pressure Pin should not be increased.

When determined in step S10 that the hydraulic pressure Pin should be increased (step S10: YES), the electronic control unit 300 proceeds to step S20 and determines whether or not the hydraulic pressure Pin is greater than the hydraulic pressure Pout.

When determined in step S20 that the hydraulic pressure Pin is greater than the hydraulic pressure Pout (step S20: YES), the electronic control unit 300 proceeds to step S100 and executes the oscillation suppression control shown in FIG. 6.

When the oscillation suppression control is started, as shown in FIG. 6, in step S110, the electronic control unit 300 first sets the timing for further increasing the first solenoid pressure Pslp based on the drive duty of the first solenoid valve 215 and the temperature of hydraulic oil detected by the oil temperature sensor 308.

After the output of the first solenoid pressure Pslp for increasing the hydraulic pressure Pin is started and the valve body 217a is driven in the valve opening direction, the timing for starting movement of the valve body 217a in the valve closing direction, that is, the timing of time t3 in FIG. 3 changes in accordance with the responsiveness or the like of the actual movement of the valve body 217a with respect to changes in the first solenoid pressure Pslp.

When the temperature of the hydraulic oil is high, the viscosity of the hydraulic oil decreases. Thus, the responsiveness of the actual movement of the valve body 217a with respect to changes in the first solenoid pressure Pslp increases as the temperature of the hydraulic oil increases. That is, as the temperature of the hydraulic oil increases, the valve body 217a moves more rapidly when the first solenoid pressure Pslp is changed. Further, after the first solenoid pressure Pslp is output, the timing at which the valve body 217a starts to move in the valve closing direction is also advanced as the temperature of the hydraulic oil increases.

As the first solenoid pressure Pslp increase to increase the hydraulic pressure Pin, the valve opening speed of the valve body 217a increases when the first solenoid pressure Pslp is output. That is, as the first solenoid pressure Pslp increases to increase the hydraulic pressure Pin, the valve body 217a moves more rapidly, and the timing at which the valve body 217a starts to move in the valve closing direction is also advanced.

Here, the time (time Tint in FIG. 4) from when output of the first solenoid pressure Pslp starts to when the first solenoid pressure Pslp is further increased is set based on the temperature of the hydraulic oil and the level of the drive duty when output of the first solenoid pressure Pslp is started to increase the hydraulic pressure Pin. The time Tint is set to be shorter as the temperature of the hydraulic oil increases and the drive duty decreases when output of the first solenoid pressure Pslp for increasing the hydraulic pressure Pin is started.

By setting the length of the time Tint in this manner, the timing at which the first solenoid pressure Pslp is further increased is advanced as the temperature of the hydraulic oil increases and the first solenoid pressure Pslp increases to increase the hydraulic pressure Pin.

After setting the timing for further increasing the first solenoid pressure Pslp in step S110, the electronic control unit 300 proceeds to step S120 and further increases the first solenoid pressure Pslp when the set timing is reached. Specifically, the drive duty is further decreased when the set timing is reached. This further increases the first solenoid pressure Pslp.

When the oscillation suppression control is executed through step S110 and step S120 in this manner, the electronic control unit 300 temporarily terminates the series of processes.

If determined in step S10 of FIG. 5 that the hydraulic pressure Pin should not be increased (step S10: NO), the electronic control unit 300 skips step S20 and step S100 and terminates the series of processes without executing the oscillation suppression control.

If determined in step S20 that the hydraulic pressure Pin is less than or equal to the hydraulic pressure Pout (step S20: NO), the electronic control unit 300 skips step S100 and terminates the series of processes without executing the oscillation suppression control.

In this manner, after increasing the first solenoid pressure Pslp to increase the hydraulic pressure Pin, the oscillation suppression control further temporarily increases the first solenoid pressure Pslp to offset the portion of the force that acts to move the valve body 217a, which has been excessively moved in the valve opening direction, in the valve closing direction. This suppresses movement of the valve body 217a. Thus, as shown in FIG. 4, undershooting of the hydraulic pressure Pin can be suppressed, and oscillation of the hydraulic pressure Pin can be suppressed.

The first embodiment has the advantages described below.

(1) In the hydraulic pressure controller according to the present embodiment, after driving the valve body 217a of the first control valve 217 that controls the hydraulic pressure Pin in the valve opening direction, the oscillation suppression control is executed to temporarily suppress the movement of the valve body 217a.

Thus, oscillation of the valve body 217a when the valve body 217a is driven in the valve opening direction is suppressed, and repetitive increasing and decreasing of the hydraulic pressure Pin supplied to the first pulley 130 over the target hydraulic pressure Ptrg is suppressed. Further, oscillation of the valve body 217a is suppressed in this manner, and oscillation of the hydraulic pressure Pin supplied to the first pulley 130 is suppressed. This suppresses oscillation of the line pressure Pl, which is feedback adjusted based on the hydraulic pressure Pin.

As a result, the occurrence of an adverse cycle is suppressed in which the line pressure Pl is adjusted based on the oscillating hydraulic pressure Pin, and the hydraulic pressures Pin and Pout supplied to the pulleys 130 and 150 are adjusted based on the oscillating line pressure Pl.

In other words, the line pressure Pl is feedback adjusted in accordance with the levels of the hydraulic pressures Pin and Pout, excessive increase of the drive load of the oil pump 211 is suppressed, and oscillation of the hydraulic pressures Pin and Pout and the line pressure Pl when the hydraulic pressure Pin changes is suppressed.

Further, as a result, when the hydraulic pressure Pin of the first pulley 130 changes, repetitive increase and decrease of the tension on the belt 140 is suppressed, and a decrease in the durability of the continuously variable transmission 100 is suppressed.

(2) As described above, after the first solenoid pressure Pslp is output to increase the hydraulic pressure Pin and the valve body 217a is driven in the valve opening direction, the timing at which the valve body 217a starts to move in the valve closing direction changes in accordance with the responsiveness or the like of the actual movement of the valve body 217a with respect to changes in the first solenoid pressure Pslp. When the temperature of the hydraulic oil is high, the viscosity of the hydraulic oil decreases. Thus, the responsiveness of the actual movement of the valve body 217a with respect to changes in the first solenoid pressure Pslp increases as the temperature of the hydraulic oil increases. In other words, as the temperature of the hydraulic oil increases, the valve body 217a moves more readily when the first solenoid pressure Pslp. Further, as the temperature of the hydraulic oil increases, the timing at which the valve body 217a starts to move in the valve closing operation becomes earlier.

In the first embodiment, after starting the output of the first solenoid pressure Pslp to drive the valve body 217a in the valve opening direction thereby increasing the hydraulic pressure Pin, the timing for further increasing the first solenoid pressure Pslp is advanced as the temperature of the hydraulic oil increases. Thus, the first solenoid pressure Pslp can be changed in accordance with changes in the responsiveness of the actual movement of the valve body 217a with respect to the changes in the first solenoid pressure Pslp when the temperature of the hydraulic oil changes. Accordingly, the oscillation of the valve body 217a is accurately suppressed, and the oscillation of the hydraulic pressure Pin is properly suppressed.

(3) The valve opening speed of the valve body 217a when the first solenoid pressure Pslp increases as the first solenoid pressure Pslp increases to increase the hydraulic pressure Pin. In other words, as the first solenoid pressure Pslp output to drive the valve body 217a in the valve opening direction increases, the valve body 217a is moved more readily when the first solenoid pressure Pslp is output. This advances the timing at which the valve body 217a starts to move in the valve closing direction. In this regard, in the first embodiment, the timing for further increasing the first solenoid pressure Pslp is set based on the level of the drive duty output to increase the hydraulic pressure Pin. As the duty ratio output to increase the hydraulic pressure Pin decreases and the first solenoid pressure Pslp output to increase the hydraulic pressure Pin increases, the timing for changing the drive duty to further increase the first solenoid pressure Pslp is advanced.

Thus, the timing for changing the first solenoid pressure Pslp can be set in accordance with changes in the valve opening speed of the valve body 217a when the first solenoid pressure Pslp is output, and oscillation of the valve body 217a can be effectively suppressed.

(4) The oscillation of the valve body 217a is apt to occurring when the first solenoid pressure Pslp is output to increase the hydraulic pressure Pin supplied to the first pulley 130, and the first solenoid pressure Pslp acts on the valve body 217a to drive the valve body 217a in the valve opening direction. In this regard, in the first embodiment, the oscillation suppression control is executed when the hydraulic pressure Pin increases and when the hydraulic pressure Pin is greater than the hydraulic pressure Pout.

Thus, when increasing the hydraulic pressure Pin supplied to the first pulley 130, the oscillation suppression control is executed under a situation that may result in an adverse cycle in which the hydraulic pressures Pin and Pout supplied to the pulley 130 and 150 are oscillated continues for a long period of time due to feedback adjustment of the line pressure P1 performed in accordance with changes in the hydraulic pressure Pin supplied to the first pulley 130.

Accordingly, a state in which the hydraulic pressures Pin and Pout supplied to the pulleys 130 and 150 oscillate continuously over a long period of time is suppressed in a preferred manner.

The first embodiment may be modified in the forms described below.

The first embodiment is configured to set the timing that further increases the first solenoid pressure Pslp based on the temperature of the hydraulic oil and the drive duty for increasing the hydraulic pressure Pin. The timing for further increasing the first solenoid pressure Pslp may also be set based on only one of the temperature of the hydraulic oil and the drive duty.

The method for setting the timing to further increase the first solenoid pressure Pslp in the first embodiment is one example of a method for setting the timing for further increasing the first solenoid pressure Pslp, and the present invention is not limited to the setting shown illustrated in the first embodiment. In other words, as long as movement of the valve body 217a in the valve closing direction can be suppressed after the first solenoid pressure Pslp is output to increase the hydraulic pressure Pin, the method for setting the timing for further increasing the first solenoid pressure Pslp can be changed as required.

In the first embodiment, the oscillation suppression control increases the first solenoid pressure Pslp only once after the output of the first solenoid pressure Pslp is started to increase the hydraulic pressure Pin. However, the oscillation suppression control may increase the first solenoid pressure Pslp over a number of times. In other words, the oscillation suppression control may cyclically increase in accordance with the cycle of the oscillation of the hydraulic pressure Pin to suppress movement of the valve body 217a and suppress oscillation of the hydraulic pressure Pin.

In the first embodiment, the drive duty is changed to further increase the first solenoid pressure Pslp and thereby suppress undershooting in which the hydraulic pressure Pin becomes lower than the target hydraulic pressure Ptrg. In this regard, after increasing the first solenoid pressure Pslp to increase the hydraulic pressure Pin, the drive duty may be temporarily changed to decrease the first solenoid pressure Pslp and suppress overshooting in which the hydraulic pressure Pin becomes greater than the target hydraulic pressure Ptrg by suppressing movement of the valve body 217a. This suppresses oscillation of the hydraulic pressure Pin.

In addition, after increasing the first solenoid pressure Pslp to increase the hydraulic pressure Pin, the first solenoid pressure Pslp may be alternately and repetitively increased and decreased in accordance with the oscillation cycle of the hydraulic pressure Pin to temporarily suppress movement of the valve body 217a and suppress oscillation of the hydraulic pressure Pin.

Second Embodiment

Figure 7:
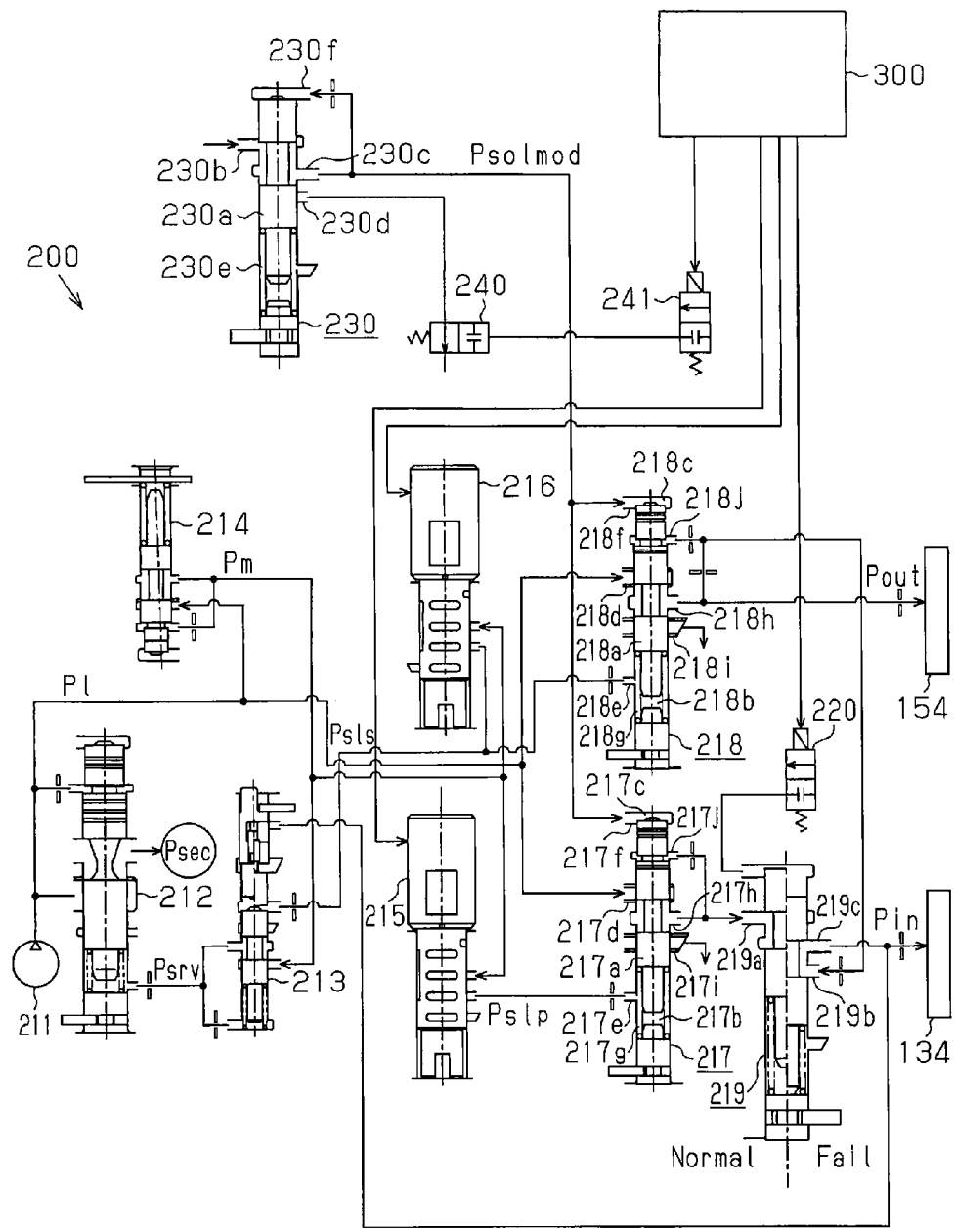
FIG. 7 is a schematic diagram showing the structure of a hydraulic pressure control unit in a hydraulic pressure controller according to a second embodiment.

A second embodiment of a hydraulic pressure controller for a continuously variable transmission according to the present invention applied to an electronic control unit 300 that controls a continuously variable transmission 100, which is installed in a vehicle, and a hydraulic pressure control unit 200 will now be described with reference to FIGS. 7 and 8. The present embodiment differs from the first embodiment in that a closing valve 240 and a switching solenoid valve 241, which drives the closing valve 240, are added to the hydraulic pressure control unit 200, as shown in FIG. 7. Otherwise, the present embodiment is the same as the first embodiment. Thus, in the description hereafter, components that are the same as the first embodiment will not be described, and components differing from the first embodiment will be described in detail.

The hydraulic pressure control unit 200 of the present embodiment includes the closing valve 240 on the discharge passage through which the hydraulic oil discharged from the discharge port 230*d* of the pressure adjustment valve 230 flows, as shown in FIG. 7. The closing valve 240 can switch between states closing and opening the discharge passage.

Further, the hydraulic pressure control unit 200 of the present embodiment includes the switching solenoid valve 241 that drives the closing valve 240. The switching solenoid valve 241 is a solenoid valve electrically driven based on a drive command from the electronic control unit 300 and switched between an "ON" state, in which the driving hydraulic pressure is output to the closing valve 240, and an "OFF" state, in which the driving hydraulic pressure is not output.

When the switching solenoid valve 241 is switched to the "ON" state, the driving hydraulic pressure is output, and the driving hydraulic pressure switches the closing valve 240 to the state closing the discharge passage, that is, a valve closing state.

When the switching solenoid valve 241 is switched to the "OFF" state, the drive hydraulic pressure is not output, and the closing valve 240 is switched to the state opening the discharge passage, that is, the valve opening state.

In the present embodiment, the discharge passage is closed by closing the closing valve 240 to prohibit the discharge of hydraulic oil from the second pressure chamber 217*c* of the first control valve 217 and the supply of hydraulic oil to the second pressure chamber 217*c* and execute oscillation suppression control that suppresses movement of the valve body 217*a*.

More specifically, the series of processes shown in FIG. 5 are repetitively executed while the engine is running in the same manner as the first embodiment. When determined that the hydraulic pressure Pin should be increased (step S10: YES) and that the hydraulic pressure Pin is greater than the hydraulic pressure Pout (step S20: YES), the process proceeds to step S100 to execute the oscillation suppression control.

Figure 8:
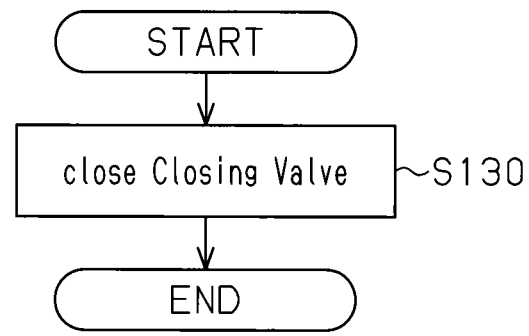
FIG. 8 is a flowchart showing a flow of processes in the oscillation suppression control of the second embodiment.

In the present embodiment, the oscillation suppression control shown in FIG. 8 is executed. As shown in FIG. 8, when the oscillation suppression control is started, in step S130, the electronic control unit 300 sets the switching solenoid valve 241 to the "ON" state and switches the closing valve 240 to the valve closing state.

When closing the closing valve 240 in step S130 and executing the oscillation suppression control, the electronic control unit 300 temporarily terminates the series of processes.

In this manner, when the closing valve 240 is closed in step S130 and the oscillation suppression control is executed, the discharge of hydraulic oil from the discharge port 230*d* of the pressure adjustment valve 230 is prohibited. When the discharge of the hydraulic oil from the discharge port 230*d* of the pressure adjustment valve 230 is prohibited, the hydraulic oil in the second pressure chamber 217*c* is not discharged even if the solenoid modulator pressure Psolmod supplied to the second pressure chamber 217*c* of the first control valve 217 becomes high. When the hydraulic oil in the second pressure chamber 217*c* is no longer discharged, the solenoid modulator pressure Psolmod increases and the input port 230*b* is closed by the valve body 230*a*. This prohibits the supply of hydraulic oil to the second pressure chamber 217*c*.

Thus, the execution of the oscillation suppression control prohibits the discharge of hydraulic oil from the second pressure chamber 217*c* and the supply of hydraulic oil to the second pressure chamber 217*c*. As a result, the volume of the second pressure chamber 217*c* barely changes, and the valve body 217*a* barely moves.

Accordingly, when the output of the first solenoid pressure Pslp for increasing the hydraulic pressure Pin is started and the valve body 217*a* is driven in the valve opening direction, excessive movement of the valve body 217*a* in the valve opening direction can be suppressed. Further, subsequent movement of the valve body 217*a* can also be suppressed.

Thus, oscillation of the valve body 217*a* can be suppressed, and oscillation of the hydraulic pressure Pin can be suppressed when the valve body 217*a* is oscillated.

In this manner, the second embodiment has advantages (1) and (4) of the first embodiment.

The second embodiment may be modified in the forms described below.

In the second embodiment, the closing valve 240 is arranged in the discharge passage through which the hydraulic oil discharged from the discharge port 230*d* of the pressure adjustment valve 230 flows. The closing valve 240 only needs to be arranged at a position at which the discharge of hydraulic oil from the second pressure chamber 217*c* of the first control valve 217 and the supply of the hydraulic oil to the second pressure chamber 217*c* can be prohibited. Thus, the closing valve 240 may be arranged in a passage connecting the third input port 217*f* of the first control valve 217 and the output port 230*c* of the pressure adjustment valve 230.

The closing valve 240 is driven by the driving hydraulic pressure output from the switching solenoid valve 241. However, the closing valve 240 may be formed by an electrically driven solenoid valve, and the closing valve 240 may be directly driven by the electronic control unit 300.

Elements that can be changed in each embodiment described include the following.

In the embodiments described above, the second solenoid pressure Psls is conveyed to the reduction valve 213. In the reduction valve 213, the line pressure adjustment hydraulic pressure Psrv is set based on the hydraulic pressure Pin and the second solenoid pressure Psls, and output to the regulator valve 212. However, the hydraulic pressure Pout supplied to the hydraulic pressure chamber 154 in the second pulley 150 may be conveyed to the reduction valve 213 instead of the second solenoid pressure Psls, and the line pressure Pl may be feedback adjusted based on the hydraulic pressure Pin and the hydraulic pressure Pout.

The present invention may be applied even to a hydraulic pressure controller that feedback adjusts the line pressure Pl based on the hydraulic pressure Pin and the hydraulic pressure Pout.

When the line pressure Pl is feedback adjusted based on the hydraulic pressure Pin and the hydraulic pressure Pout, oscillation of the hydraulic pressure Pout as a result of the oscillation of the valve body 218*a* produces an advertent cycle in which the oscillation is propagated to the line pressure Pl and the hydraulic pressures Pin and Pout are adjusted based on the oscillating line pressure Pl.

Thus, when employing such a configuration, it is preferred that the oscillation suppression control be executed to further increase the second solenoid pressure Psls after increasing the second solenoid pressure Psls to increase the hydraulic pressure Pout.

When employing a configuration executing the oscillation suppression control that closes the closing valve 240 like in the second embodiment, the discharge of the hydraulic oil from the second pressure chamber 218c of the second control valve 218 and the supply of the hydraulic oil to the second pressure chamber 218c are prohibited during execution of the oscillation suppression control. Thus, oscillation of the valve body 218a of the second control valve 218 can be suppressed by executing oscillation suppression control that closes the closing valve 240 like in the second embodiment.

Thus, if the line pressure Pl is feedback adjusted based on the hydraulic pressure Pin and the hydraulic pressure Pout, it is preferred that the conditions for executing of the oscillation suppression control in the second embodiment be changed so that the oscillation suppression control is executed even when the hydraulic pressure Pout is increased.

The executing conditions of the oscillation suppression control are not limited to the executing conditions of the embodiments described above. Thus, the executing conditions of the oscillation suppression control can be changed as required in accordance with the configuration of the hydraulic pressure control unit 200 to which the present invention is applied.

In the embodiment described above, the hydraulic pressure controller for the continuously variable transmission according to the present invention is embodied as the hydraulic pressure controller for controlling the continuously variable transmission 100 that is installed in a vehicle. However, the present invention is not limited to a hydraulic pressure controller that controls a continuously variable transmission installed in a vehicle. That is, the present invention can be applied as a hydraulic pressure controller that controls a continuously variable transmission other than one installed in a vehicle.

In the embodiments described above, the oil temperature sensor 308 is used as an estimating means for estimating the temperature of the hydraulic oil, and the temperature of the hydraulic oil is detected by the oil temperature sensor 308. However, the structure of the estimating means may be changed as long as the temperature of the hydraulic oil can be estimated. For instance, a structure that estimates a heat generation amount of the internal combustion engine 400 based on an integrated value of the intake air amount GA and estimates the temperature of the hydraulic oil based on the heat generation amount or a structure that estimates the temperature of the hydraulic oil based on the temperature of an engine coolant, which cools the internal combustion engine 400, may be employed as the estimating means.

The structures of the continuously variable transmission 100, the hydraulic pressure control unit 200, and the electronic control unit 300 in the above embodiments are examples embodying the present invention. These structures may be changed as required.

In other words, the present invention is not limited to the continuously variable transmission 100, the hydraulic pressure control unit 200, and the electronic control unit 300 configured like in the embodiments described above. The present invention may be applied to a hydraulic pressure controller that feedback adjusts the line pressure Pl based on the hydraulic pressures Pin and Pout supplied to the pulleys 130 and 150

DESCRIPTION OF THE REFERENCE CHARACTERS

100: continuously variable transmission
110: torque converter
120: switching mechanism
121: forward clutch
122: reverse brake
130: first pulley
134: hydraulic pressure chamber
140: belt
150: second pulley
154: hydraulic pressure chamber
200: hydraulic pressure control unit
211: oil pump
212: regulator valve
213: reduction valve
214: modulator valve
215: first solenoid valve
216: second solenoid valve
217: first control valve
217a: valve body
217b: first pressure chamber
217c: second pressure chamber
217d: first input port
217e: second input port
217f: third input port
217g: spring
217h: output port
217i: discharge port
217j: feedback port
218: second control valve
218a: valve body
218b: first pressure chamber
218c: second pressure chamber
218d: first input port
218e: second input port
218f: third input port
218g: spring
218h: output port
218i: discharge port
218j: feedback port
219: failsafe valve
219a: first input port
219b: second input port
219c: output port
220: switching solenoid valve
230: pressure adjustment valve
230a: valve body
230b: input port
230c: output port
230d: discharge port
230e: spring
230f: feedback port
240: closing valve
241: switching solenoid valve
300: electronic control unit
301: acceleration position sensor
302: airflow meter
303: crank angle sensor
304: turbine rotation speed sensor
305: first pulley rotation speed sensor
306: second pulley rotation speed sensor
307: wheel speed sensor
308: oil temperature sensor
400: internal combustion engine
410: intake passage
411: throttle valve

The invention claimed is:
1. A hydraulic pressure controller for a continuously variable transmission that changes hydraulic pressure supplied to each pulley of the continuously variable transmission to change a gear ratio, the hydraulic pressure controller comprising:
- an oil pump;
- a regulator valve that adjusts hydraulic pressure of hydraulic oil discharged from the oil pump and output as a line pressure by bifurcating the oil discharged from the oil pump; and
- a first and a second control valve each of which further adjusts the line pressure and outputs a control pressure as hydraulic pressure supplied to each of the pulleys of the continuously variable transmission;
- a hydraulic pressure circuitry configured to execute a hydraulic pressure controller feedback, wherein the hydraulic pressure controller feedback adjusts the line pressure in accordance with a level of the hydraulic pressure supplied to the pulleys, and after driving a valve body of each control valve in the valve opening direction, the hydraulic pressure circuitry executes oscillation suppression control that temporarily suppresses movement of the valve body,
- the control valve uses a driving hydraulic pressure input to the control valve to drive the valve body in the valve opening direction, and
- after the hydraulic pressure controller starts to drive the valve body in the valve opening direction, the oscillation suppression control further changes the driving hydraulic pressure to suppress movement of the valve body in a valve closing direction when the valve body oscillates as the output of the driving hydraulic pressure starts.

2. The hydraulic pressure controller for the continuously variable transmission according to claim 1, wherein
the oscillation suppression control executes the further changing of the driving hydraulic pressure by further increasing the driving hydraulic pressure in accordance with a timing at which the valve body starts to move in the valve closing direction to suppress the movement of the valve body in the valve closing direction.

3. The hydraulic pressure controller for the continuously variable transmission according to claim 1, further comprising:
- an estimating circuitry configured to estimate the temperature of the hydraulic oil,
- wherein the oscillation suppression control advances a timing for the further changing of the driving hydraulic pressure as the temperature of the hydraulic oil increases.

4. The hydraulic pressure controller for the continuously variable transmission according to claim 1, wherein the oscillation suppression control advances a timing for the further changing of the driving hydraulic pressure as the driving hydraulic pressure output to drive the valve body in the valve opening direction increases.

5. The hydraulic pressure controller for the continuously variable transmission according to claim 1, wherein
the hydraulic pressure controller feedback adjusts the line pressure in correspondence with a change in a larger one of a hydraulic pressure supplied to a first pulley, which is coupled to an internal combustion engine, and a hydraulic pressure supplied to a second pulley, which is coupled to a vehicle wheel, and
when increasing the hydraulic pressure supplied to the first pulley, the hydraulic pressure circuitry executes the oscillation suppression control when the hydraulic pressure supplied to the first pulley becomes greater than the hydraulic pressure supplied to the second pulley.

6. A hydraulic pressure controller for a continuously variable transmission that changes hydraulic pressure supplied to each pulley of the continuously variable transmission to change a gear ratio, the hydraulic pressure controller comprising:
- an oil pump;
- a regulator valve that adjusts hydraulic pressure of hydraulic oil discharged from the oil pump and output as a line pressure by bifurcating the oil discharged from the oil pump; and
- a first and a second control valve each of which further adjusts the line pressure and outputs a control pressure as hydraulic pressure supplied to each of the pulleys of the continuously variable transmission;
- a hydraulic pressure circuitry configured to execute a hydraulic pressure controller feedback, wherein the hydraulic pressure controller feedback adjusts the line pressure in accordance with a level of the hydraulic pressure supplied to the pulleys, and after driving a valve body of each control valve in the valve opening direction, the hydraulic pressure circuitry executes oscillation suppression control that temporarily suppresses movement of the valve body, wherein
the control valve includes a first pressure chamber into which a driving hydraulic pressure will flow to move the valve body in the valve opening direction, a biasing member accommodated in the first pressure chamber to bias the valve body in a valve opening direction, and a second pressure chamber arranged at an opposite side of the first pressure chamber with the valve body arranged in between, wherein the level of the driving hydraulic pressure supplied to the first pressure chamber is changed to drive the valve body, and
after starting to drive the valve body in the valve opening direction, the oscillation suppression control suppresses the movement of the valve body by prohibiting discharge of the hydraulic oil from the second pressure chamber.

7. The hydraulic pressure controller for the continuously variable transmission according to claim 6, further comprising:
- a pressure adjustment valve including a valve body moved to connect the second pressure chamber and a discharge passage when the hydraulic pressure in the second pressure chamber increases and discharge some of the hydraulic oil from the second pressure chamber through the discharge passage; and
- a closing valve that can switch between a state closing the discharge passage and a state opening the discharge passage,
- wherein the closing valve closes the discharge passage to prohibit the discharge of the hydraulic oil from the second pressure chamber.

* * * * *